United States Patent [19]
Barker et al.

[11] Patent Number: 5,871,866
[45] Date of Patent: Feb. 16, 1999

[54] LITHIUM-CONTAINING PHOSPHATES, METHOD OF PREPARATION, AND USE THEREOF

[75] Inventors: Jeremy Barker; M. Yazid Saidi, both of Henderson, Nev.

[73] Assignee: Valence Technology, Inc., Henderson, Nev.

[21] Appl. No.: 717,979

[22] Filed: Sep. 23, 1996

[51] Int. Cl.[6] .................................................. H01M 4/48
[52] U.S. Cl. .................................... 429/231.1; 429/231.2
[58] Field of Search .............................................. 429/218

[56] References Cited

U.S. PATENT DOCUMENTS

| | | |
|---|---|---|
| 4,009,092 | 2/1977 | Taylor . |
| 4,049,891 | 9/1977 | Hong et al. ............................. 429/193 |
| 4,260,668 | 4/1981 | Lecerf et al. . |
| 4,434,216 | 2/1984 | Joshi et al. . |
| 4,512,905 | 4/1985 | Clearfield et al. . |
| 4,683,181 | 7/1987 | Armand et al. . |
| 4,690,877 | 9/1987 | Gabano et al. . |
| 4,707,422 | 11/1987 | de Neufville et al. . |
| 4,985,317 | 1/1991 | Adachi et al. . |
| 5,232,794 | 8/1993 | Krumpelt et al. . |
| 5,262,548 | 11/1993 | Barone . |
| 5,296,436 | 3/1994 | Bortinger . |

FOREIGN PATENT DOCUMENTS 61-263069  11/1986  Japan .

OTHER PUBLICATIONS

Delmas et al., "The Chemical Short Circuit Method . . . " Mat. Res. Bull., vol. 23, pp. 65–72 (month not available.), 1988.

Okada et al., "Fe2(SO4)3 as a cathode Material for Rechargeable Lithium Batteries", Proc. 36th Power Sources Conf. at Cherry Hill, New Jersey, Jun. 1994.

Delmas et al., "A Nasicon–type phase as intercalation electrode" Mater. Res. Bull., (1987), 22(5), 631–9, (No month available, 1987.

Nanjundaswamy et al., "Synthesis, redox potential evaluation and electrochemical characteristics of Nasicon–related 3–D framework compounds", Solid state Ionics, 92 (1996) 1–10, Nov. 1996.

Delmas et al., "The Nasicon–type titanium phosphates ATi2(PO4)3 as electrode matierals", Solid State Ionics (1988), vol. Date 1987, 28–30 (pt. 1) 419–23. (no month available), 1987.

Adachi et al., Chemical Abstracts Accession No. 113:129692, "Lithium Ion Conductive Solid Electrolyte". (No month available), 1989.

(List continued on next page.)

*Primary Examiner*—Maria Nuzzolillo
*Assistant Examiner*—Carol Chaney
*Attorney, Agent, or Firm*—Linda Deschere

[57] ABSTRACT

The invention provides an electrochemical cell which comprises a first electrode and a second electrode which is a counter electrode to said first electrode. The first electrode comprises a phosphorous compound of the general formula, $Li_3M'M''(PO_4)_3$. M' and M" are the same or different from one another. Where M' and E" are the same, they are metals having more than one oxidation state. Where M' and M" are different from one another, they are selected from the group of metals where at least one of M' and M" has more than one oxidation state.

5 Claims, 3 Drawing Sheets

OTHER PUBLICATIONS

Hagenmuller et al., "Intercalation in 3–D Skeleton Structure", Mater. Res. Soc. Symp. Proc. (1991) 210 (Solid State Ionics 2), 323–34 (no month), 1991.

Padhi et al., "Lithium intercalation into Nasicon type mixed phosphates", Proc. Power Sources Conf., (1996) 37th, 180–185, Jun. 1996.

Padhi et al., "Lithium intercalation into Nascion . . . ", Proc. Power Sources Cong., 37th, pp. 181–183, Jun. 1996.

Sisler et al., "Chemistry A systematic Approach", Oxford University Press, p. 746. (No month available), 1980.

J. Gopalakrishnan and K. Kasthuri Rangan, "$V_2(PO)_3$: A Novel Nasicon–Type Vanadium Phosphate Synthesized by Oxidative Deintercalation of Sodium from $Na_3V_2(PO_4)_3$," Chemistry of Materials, vol. 4, No. 4, 745–747, Jul./Aug. 1992.

K. Kasthuri Rangan and J. Gopalakrishnan, "New Titanium–Vanadium Phosphates of Nasicon and Langbeinite Structures, and Differences betwen the two Structures Toward Deintercalation of Alkali Metal," Journal of Solid State Chemistry, 109, 116–121, 1994 (no month).

LITHIUM-CONTAINING PHOSPHATES, METHOD OF PREPARATION, AND USE THEREOF

FIELD OF THE INVENTION

This invention relates to improved materials usable as electrode active materials, method for making such improved materials, and electrodes formed from it for electrochemical cells in batteries.

BACKGROUND OF THE INVENTION

Lithium batteries are prepared from one or more lithium electrochemical cells containing electrochemically active (electroactive) materials. Such cells typically include an anode (negative electrode), a cathode (positive electrode), and an electrolyte interposed between spaced apart positive and negative electrodes. Batteries with anodes of metallic lithium and containing metal chalcogenide cathode active material are known. The electrolyte typically comprises a salt of lithium dissolved in one or more solvents, typically nonaqueous (aprotic) organic solvents. Other electrolytes are solid electrolytes typically called polymeric matrixes that contain an ionic conductive medium, typically a metallic powder or salt, in combination with a polymer that itself may be tonically conductive which is electrically insulating. By convention, during discharge of the cell, the negative electrode of the cell is defined as the anode. Cells having a metallic lithium anode and metal chalcogenide cathode are charged in an initial condition. During discharge, lithium ions from the metallic anode pass through the liquid electrolyte to the electrochemical active (electroactive) material of the cathode whereupon they release electrical energy to an external circuit.

It has recently been suggested to replace the lithium metal anode with an intercalation anode, such as a lithium metal chalcogenide or lithium metal oxide. Carbon anodes, such as coke and graphite, are also intercalation materials. Such negative electrodes are used with lithium-containing intercalation cathodes, in order to form an electroactive couple in a cell. Such cells, in an initial condition, are not charged. In order to be used to deliver electrochemical energy, such cells must be charged in order to transfer lithium to the anode from the lithium-containing cathode. During discharge the lithium is transferred from the anode back to the cathode. During a subsequent recharge, the lithium is transferred back to the anode where it reintercalates. Upon subsequent charge and discharge, the lithium ions ($Li^+$) are transported between the electrodes. Such rechargeable batteries, having no free metallic species are called rechargeable ion batteries or rocking chair batteries. See U.S. Pat. Nos. 5,418,090; 4,464,447; 4,194,062; and 5,130,211.

Preferred positive electrode active materials include $LiCoO_2$, $LiMn_2O_4$, and $LiNiO_2$. The cobalt compounds are relatively expensive and the nickel compounds are difficult to synthesize. A relatively economical positive electrode is $LiMn_2O_4$, for which methods of synthesis are known, and involve reacting generally stoichiometric quantities of a lithium-containing compound and a manganese containing compound. The lithium cobalt oxide ($LiCoO_2$), the lithium manganese oxide ($LiMn_2O_4$), and the lithium nickel oxide ($LiNiO_2$) all have a common disadvantage in that the charge capacity of a cell comprising such cathodes suffers a significant loss in capacity. That is, the initial capacity available (amp hours/gram) from $LiMn_2O_4$, $LiNiO_2$, and $LiCoO_2$ is less than the theoretical capacity because less than 1 atomic unit of lithium engages in the electrochemical reaction. Such an initial capacity value is significantly diminished during the first cycle operation and such capacity further diminishes on every successive cycle of operation. The specific capacity for $LiMn_2O_4$ is at best 148 milliamp hours per gram. As described by those skilled in the field, the best that one might hope for is a reversible capacity of the order of 110 to 120 milliamp hours per gram. Obviously, there is a tremendous difference between the theoretical capacity (assuming all lithium is extracted from $LiMn_2O_4$) and the actual capacity when only 0.8 atomic units of lithium are extracted as observed during operation of a cell. For $LiNiO_2$ and $LiCoO_2$ only about 0.5 atomic units of lithium is reversibly cycled during cell operation. Many attempts have been made to reduce capacity fading, for example, as described in U.S. Pat. No. 4,828,834 by Nagaura et al. However, the presently known and commonly used, alkali transition metal oxide compounds suffer from relatively low capacity. Therefore, there remains the difficulty of obtaining a lithium-containing chalcogenide electrode material having acceptable capacity without disadvantage of significant capacity loss when used in a cell.

SUMMARY OF THE INVENTION

The invention provides novel lithium-containing phosphate materials having a high proportion of lithium per formula unit of the material. Upon electrochemical interaction, such material deintercalates lithium ions, and is capable of reversibly cycling lithium ions. The invention provides a rechargeable lithium battery which comprises an electrode formed from the novel lithium-containing phosphates, preferably lithium-metal-phosphates. Methods for making the novel phosphates and methods for using such phosphates in electrochemical cells are also provided. Accordingly, the invention provides a rechargeable lithium battery which comprises an electrolyte; a first electrode having a compatible active material; and a second electrode comprising the novel phosphate materials. The novel materials, preferably used as a positive electrode active material, reversibly cycle lithium ions with the compatible negative electrode active material. Desirably, the phosphate has a proportion in excess of 2 atomic units of lithium per formula unit of the phosphate, and upon electrochemical interaction the proportion of lithium ions per formula unit become less. Desirably, the lithium-containing phosphate is represented by the nominal general formula $Li_aE'_bE''_c(PO_4)_3$ where in an initial condition "a" is about 3, and during cycling varies as $0 \leq a \leq 3$; b and c are both greater than 0, and b plus c is about 2. In one embodiment, elements E' and E" are the same. In another embodiment, E' and E" are different from one another. At least one of E' and E" is an element capable of an oxidation state higher than that initially present in the lithium phosphate compound. Correspondingly, at least one of E' and E" has more than one oxidation state. Both E' and E" may have more than one oxidation state and both may be oxidizable from the state initially present in the phosphate compound. Desirably, at least one of E' and E" is a metal or semi-metal. Preferably, at least one of E' and E" is a metal. Preferably, the metal phosphate is represented by the nominal general formula $Li_3M'_bM''_c(PO_4)_3$, where M' and M" are each metals, b plus c is about 2, and M' and M" satisfy the conditions of oxidizability and oxidation state given for E' and E". Many combinations satisfying the above conditions are possible. For example, in one embodiment M' and M" are each transition metals. In still another embodiment where the formulation $Li_3M'M''(PO_4)_3$ comprises two different metals, M' and M", one metal M' may be selected from non-transition metals and semi-metals. In another embodiment, such non-transition metal has only one oxidation state and is nonoxidizable from its oxidation state in the final compound $Li_3M'M''(PO_4)_3$. In this case, M' may be selected from metals, such as aluminum, magnesium, calcium, potassium, and other Groups I and II metals. In this case, M" is a metal having more than one oxidation state, and is oxidizable from its oxidation state in the end product, and M" is preferably a transition metal. In another embodiment, the non-transition metal has more than one oxidation state. Examples of semi-metals having more than one oxidation state are selenium and tellurium; other non-transition metals with more than one oxidation state are tin and lead. Metallic elements include metals and semi-metals, such as semi-conductors, including silicon (Si), tellurium (Te), selenium (Se), antimony (Sb), and arsenic (As). The metal phosphates are alternatively represented by the nominal general formula $Li_{3-x}M'M''(PO_4)_3$ ($0 \leq x \leq 3$), signifying capability to deintercalate and reinsert lithium. $Li_{3-x}M'_yM''_{2-y}(PO_4)_3$ signifies that the relative amount of M' and M" may vary, with $o<y<2$, some M' and M" are each present. The same criteria as to the values of x and y apply to $Li_{3-x}E'_yE''_{2-y}(PO_4)_3$. The active material of the counter electrode is any material compatible with the lithium-metal-phosphate of the invention. Where the lithium-metal-phosphate is used as a positive electrode active material, metallic lithium may be used as the negative electrode active material where lithium is removed and added to the metallic negative electrode during use of the cell. The negative electrode is desirably a non-metallic intercalation compound. Desirably, the negative electrode comprises an active material from the group consisting of metal oxide, particularly transition metal oxide, metal chalcogenide, carbon, graphite, and mixtures thereof. It is preferred that the anode active material comprises graphite. The lithium-metal-phosphate of the invention may also be used as a negative electrode material.

The present invention resolves the capacity problem posed by widely used cathode active material. It has been found that the capacity of cells having the preferred $Li_3M'M''(PO_4)_3$ active material of the invention are greatly improved, for example, over $LiMn_2O_4$. Optimized cells containing lithium-metal-phosphates of the invention potentially have performance greatly improved over all of the presently used lithium metal oxide compounds. Advantageously, the novel lithium-metal-phosphate compounds of the invention are relatively easy to make, and readily adaptable to commercial production, are-relatively low in cost, and have very good specific capacity.

Objects, features, and advantages of the invention include an improved electrochemical cell or battery based on lithium which has improved charging and discharging characteristics, a large discharge capacity, and which maintains its integrity during cycling. Another object is to provide a cathode active material which combines the advantages of large discharge capacity and with relatively lesser capacity fading. It is also an object of the present invention to provide positive electrodes which can be manufactured more economically and relatively more conveniently, rapidly, and safely than present positive electrodes which react readily with air and moisture. Another object is to provide a method for forming cathode active material which lends itself to commercial scale production providing for ease of preparing large quantities.

These and other objects, features, and advantages will become apparent from the following description of the preferred embodiments, claims, and accompanying drawings.

BRIEF DESCRIPTION OF THE DRAWINGS

FIG. 4 is a two-part graph based on multiple constant current cycling of $Li_3V_2(PO_4)_3$ cycled with a lithium metal anode using the electrolyte as described in connection with FIG. 1 and cycled, charge and discharge at±0.25 milliamps per square centimeter, 3.0 to 4.2 volts. In the two-part graph.

DETAILED DESCRIPTION OF THE PREFERRED EMBODIMENTS

Figure 1:
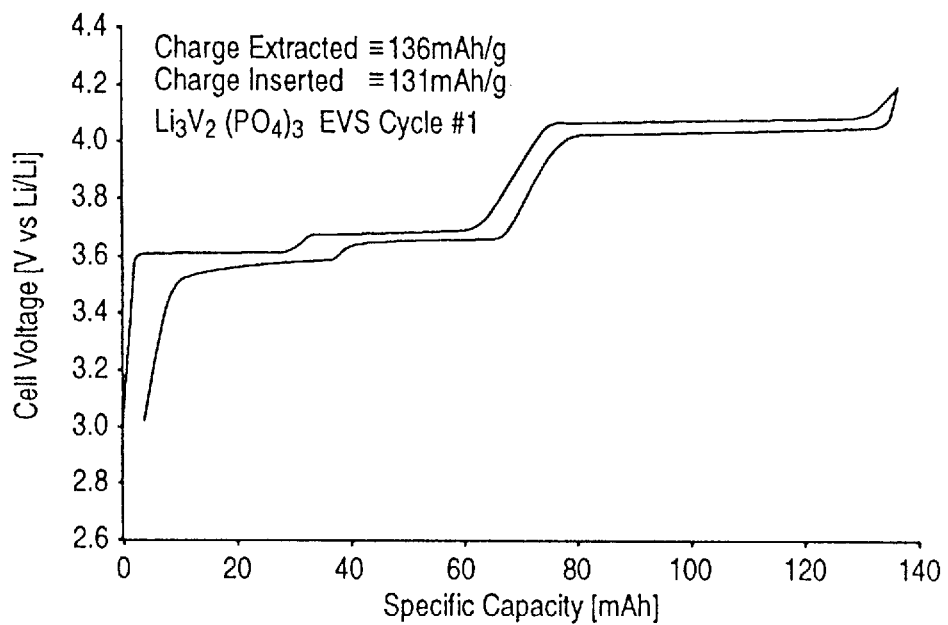
FIG. 1 is an EVS (Electrochemical Voltage Spectroscopy) voltage/capacity profile for a cell embodying the lithium-metal-phosphate material of the invention $Li_3V_2(PO_4)_3$ in combination with a lithium metal counter electrode in an electrolyte comprising ethylene carbonate (EC) and dimethyl carbonate (DMC) in a weight ratio of 2:1 and including a 1 molar concentration of $LiPF_6$ salt. The lithium-metal-phosphate containing electrode and the lithium metal counter electrode are maintained spaced apart by a separator of fiber glass which is interpenetrated by the solvent and the salt. The conditions are±10 mV steps, between about 3.0 and 4.2 volts, and the critical limiting current density is less than or equal to 0.05 mA/cm².

The present invention provides lithium-containing phosphate materials, preferably lithium-metal-phosphates, which are usable as electrode active materials, for the first time, as a source of lithium ($Li^+$) ions. Upon extraction of x lithium ions from the preferred $Li_{3-x}M'M''(PO_4)_3$, significant capacity is achieved. Such specific capacity achieved from preferred lithium-metal-phosphates is far in excess of the specific capacity from $Li_1Mn_2O_4$ ($Li_{1-x}Mn_2O_4$), an example of a currently used cathode active material. In the method of the invention, electrochemical energy is provided by deintercalation of lithium from lithium-metal-phosphates ($Li_3M'M''(PO_4)_3$). For example, when lithium is removed per formula unit of the $Li_3M'M''(PO_4)_3$, vanadium is oxidized from vanadium III to vanadium IV or V in $Li_3M_2(PO_4)_3$, $M_2=V_2$.

When 1 lithium is removed per formula unit of the lithium vanadium phosphate, $V^{III}$ is oxidized to $V^{IV}$. The electrochemical reaction is as shown below:

Further extraction is possible according to:

Note that the average oxidation state of vanadium is +4 (IV). It is thought that both of the vanadium atomic species carry a +4 charge, it is less likely that one of the vanadium species carries a +3 charge and the other a +5 charge. Advantageously, still further oxidation is possible with the removal of the final lithium ion according to the Equation:

$Li_1V^{+4}V^{+4}(PO_4)_3 \rightarrow V^{+4}V^{+5}(PO_4)_3 + Li^+ + e^-$

In the overall equation $Li_3V^{+3}V^{+3}(PO_4)_3 \rightarrow V^{+4}V^{+5}(PO_4)_3 + 3Li^+ + 3e^-$, this material has a theoretical capacity of 197 milliamp hours per gram upon electrochemical oxidation as per the reaction shown herein. The electrochemical extraction of lithium from $Li_3M'M''(PO_4)_3$ is heretofore not known to have been described. Similarly, a mixed metal compound, such as $Li_3FeV(PO_4)_3$, has two oxidizable elements. In contrast, $Li_3AlTm(PO_4)_3$ has one oxidizable metal, the transition metal (Tm).

FIGS. 1 through 4 which will be described more particularly below shows capacity in actual use where the lithium-metal-phosphate cathode (positive electrode) of the invention was tested in a cell comprising a lithium metal counter electrode (negative electrode) and an $EC:DMC-LiPF_6$ electrolyte, with operation between about 3.0 and 5.0 volts versus $L/Li^+$ where lithium is cycled between the positive electrode and the negative electrode.

In another aspect, the invention provides a lithium ion battery which comprises an electrolyte; a negative electrode having an intercalation active material; and a positive electrode comprising a lithium-metal-phosphate active material characterized by an ability to deintercalate lithium ions for intercalation into the negative electrode active material. The lithium-metal-phosphate is desirably represented by the nominal general formula $Li_3M'M''(PO_4)_3$. In one aspect, the metals M' and M'' are the same and in another aspect, the metals M' and M'' are different. Desirably, the phosphate is the compound $Li_3M_2(PO_4)_3$ where M is a transition metal, and M is most desirably V, Fe, Sr, and Mn. The lithium-metal-phosphate is preferably a compound represented by the nominal general formula $Li_{3-x}V_2(PO_4)_3$, signifying the preferred composition and its capability to deintercalate lithium. The present invention resolves a capacity problem posed by conventional cathode active materials. Such problems with conventional active materials are described by Tarascon in U.S. Pat. No. 5,425,932, using $LiMn_2O_4$ as an example. Similar problems are observed with $LiCoO_2$, $LiNiO_2$, and many, if not all, lithium metal chalcogenide materials. The present invention demonstrates that such capacity problems are overcome and greater proportion of potential in the cathode active material is utilizable providing a great improvement over conventional active materials.

The positive electrode active material in an initial condition is represented by the molecular formula $Li_{3-x}M'M''(PO_4)_3$. When used in a cell it deintercalates a quantity of x lithium ions for intercalation into the negative electrode, where the amount of x ions deintercalated is greater than 0 and less than or equal to 3. Accordingly, during cycling, charge and discharge, the value of x varies as x greater than or equal to 0 and less than or equal to 3.

Positive electrode lithium-metal-phosphate active material was prepared and tested in electrochemical cells and the results are reported in FIGS. 1 through 4. A typical cell configuration will be described with reference to FIG. 5.

Figure 5:
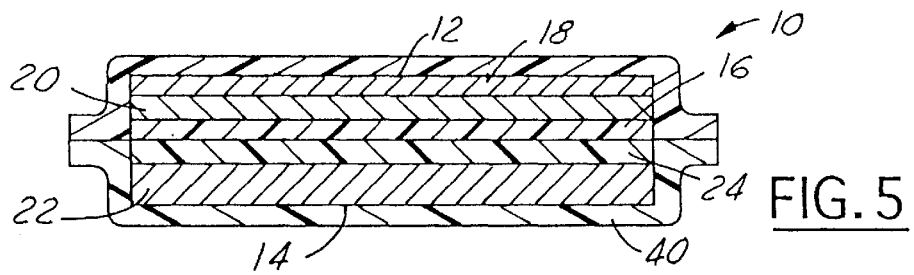
FIG. 5 is an illustration of a cross section of a thin battery or cell embodying the invention.

A description of the electrochemical cell or battery which uses the novel active material of the invention will now be described. By convention, an electrochemical cell comprises a first electrode, a counter electrode which reacts electrochemically with the first electrode, and an electrolyte which is capable of transferring ions between the electrodes. A battery refers to one or more electrochemical cells. Referring to FIG. 5, an electrochemical cell or battery 10 has a negative electrode side 12, a positive electrode side 14, and an electrolyte/separator 16 therebetween. The negative electrode is the anode during discharge, and the positive electrode is the cathode during discharge. The negative electrode side includes current collector 18, typically of nickel, iron, stainless steel, and copper foil, and negative electrode active material 20. The positive electrode side includes current collector 22, typically of aluminum, nickel, and stainless steel, and such foils may have a protective conducting coating foil, and a positive electrode active material 24. The electrolyte/separator 16 is typically a solid electrolyte, or separator and liquid electrolyte. Solid electrolytes typically referred to as polymeric matrixes which contain an ionic conductive medium. Liquid electrolytes typically comprise a solvent and an alkali metal salt which form an ionically conducting liquid. In this latter case, the separation between the anode and cathode is maintained, for example, by a relatively inert layer of material such as glass fiber. The electrolyte is not an essential feature of the invention. Essentially, any lithium ion containing conducting electrolyte may be used, that is stable up to 4.5 volts or more. Essentially any method may be used to maintain the positive and negative electrodes spaced apart and electrically insulated from one another in the cell. Accordingly, the essential features of the cell are the positive electrode, a negative electrode electrically insulated from the positive electrode, and an ionically conducting medium between the positive and negative electrodes. Examples of a suitable separator/electrolyte, solvents, and salts are described in U.S. Pat. No. 4,830,939 showing a solid matrix containing an ionically conducting liquid with an alkali metal salt where the liquid is an aprotic polar solvent; and U.S. Pat. Nos. 4,935,317; 4,990,413; 4,792,504; and 5,037,712. Each of the above patents is incorporated herein by reference in its entirety.

Electrodes of the invention are made by mixing a binder, the active material, and carbon powder (particles of carbon). The binder desirably is a polymer. A paste containing the binder, active material, and carbon, is coated onto a current collector.

Positive Electrode

A positive electrode containing the lithium phosphate compound, preferably lithium-metal-phosphate, active material of the invention is prepared by the following method. For the positive electrode, the content was as follows: 50 to 90 percent by weight active material $(Li_3M'M''(PO_4)_3)$; 5 to 30 percent carbon black as the electrically conductive diluent; and 3 to 20 percent binder. The stated ranges are not critical. The amount of active material may range from 25 to 85 weight percent. The formation of each electrode will now be described. The positive electrode was prepared from mixtures of lithium-metal-phosphate (active material) and EPDM (ethylene propylene diene monomer) as the binder, Shawinigan Black® was used as the carbon powder conductive diluent. The carbon powder conductive diluent is used to enhance electronic conductivity of the lithium-metal-phosphate. Shawinigan Black®, available from Chevron Chemical Company, San Ramone, Calif. has a BET average surface area of about 70±5 square meters per gram. Other suitable carbon blacks are sold under the designation Super P™ and Super S™ available from MMM, a subsidiary of Sedema, which carbons have BET surface areas of about 65±5 square meters per gram. (MMM has its headquarters in Brussels, Belgium.) Examples of suitable polymeric binders include EPDM (ethylene propylene diene termonomers), PVDF (polyvinylidene difluoride), ethylene acrylic acid copolymer, EVA (ethylene vinyl acetate copolymer), copolymer mixtures, and the like. It is desirable to use either PVDF available from Polysciences Corporation with a molecular weight of 120,000 or EPDM available from Exxon Corporation and sold under the designation EPDM 2504™. EPDM is also available from The Aldrich Chemical Company. The description of carbon powders and binders constitute representative examples and the invention is not limited thereby. For example, other carbon powders are available from Exxon Chemicals, Inc., Chicago, Ill. under the trade name Ketjen Black EC 600 JD® and polyacrylic acid of average molecular weight 240,000 is commercially available from BF Goodrich, Cleveland, Ohio under the name Good-Rite K702™. The positive electrodes of the invention comprised mixtures of the lithium-metal-phosphate active material, the binder (EPDM), and the carbon particles (Shawinigan Black®). These were mixed and blended together with a solvent. Xylene is a suitable solvent. The mixture was then coated onto an aluminum foil current collector to achieve a desired thickness for the final electrode.

Electrolyte

The electrolyte used to form the completed cell is preferably a combination of EC/DMC when a carbon counter electrode is used. That is, ethylene carbonate (EC) and dimethyl carbonate (DMC). The ratio of EC:DMC was about 2:1 by weight. Generally, when a lithium metal anode is used, the choice of an electrolyte is less restricted. It may be the EC:DMC in a ratio of 2:1 by weight or, for example, EC:PC (propylene carbonate) in 50:50 by weight ratio. In any case, the preferred salt is 1 molar $LiPF_6$. Positive and negative electrodes are maintained in a separated condition using a fiber glass layer. Such separation can also be achieved using a layer of Celgard™. Hoechst-Celanese Corp., Celgard 2400™, porous polypropylene, 25 microns thick.

Negative Electrode

The electrochemical cell used with the positive electrode and electrolyte may contain one of a variety of negative electrode active materials. In one embodiment, the negative electrode may be metallic lithium. In more desirable embodiments, the negative electrode is an intercalation active material, such as, metal oxides and graphite. When a metal oxide active material is used, the components of the electrode are the metal oxide, electrically conductive carbon black, and binder in the proportions as described above for the positive electrode. Representative, but not limiting, examples include coke, graphite, $WO_3$, $Nb_2O_5$, and $V_6O_{13}$. In a preferred embodiment, the negative electrode active material is graphite particles. For test purposes, for determining capacity of a positive electrode, test cells were fabricated using the lithium metal active material. When test cells are formed such as to be used as batteries, a nonmetallic intercalation graphite electrode is preferred. The preferred graphite-based negative electrode comprises about 80 to 95 percent by weight graphite particles, and more preferably about 90 percent by weight with the balance constituted by a binder. Preferably, the anode is prepared from a graphite slurry as follows. A polyvinylidene difluoride (PVDF) solution is prepared by mixing 300 grams of 120,000 MW PVDF (PolyScience) in 300 ml of dimethyl formamide. The mixture was stirred for 2 to 3 hours with a magnetic stirrer to dissolve all of the PVDF. The PVDF functions as a binder for the graphite in the anode. Next, a PVDF/graphite slurry is prepared by first adding 36 grams of graphite (SFG-15) into about 38.5 grams of the PVDF solution. The mixture is homogenized with a commercial homogenizer or blender. (For example, Tissue Homogenizer System from Cole-Parmer Instrument Co., Niles, Ill.). The viscosity of the slurry is adjusted to about 200 cp with additional PVDF solution. The slurry is coated onto a bare copper foil by standard solvent casting techniques, such as by a doctor blade type coating. (Alternatively, the slurry can be coated onto a copper foil having a polymeric adhesion promoter layer, described above.) In preparing the slurry, it is not necessary to grind or dry the graphite, nor is it necessary to add conductive carbon black to the graphite anode formulation. Finally, the electrodes are dried at approximately 150° C. for 10 hours to remove residual water prior to making the electrochemical cells.

In one embodiment, the negative electrode has the lithium-metal-phosphate compound as the active material. In the case of $Li_3V^{+3}V^{+3}(PO_4)_3$, the $V^{+3}$ would theoretically be reduced to $V^{+2}$. For $Li_3Fe^{+3}Fe^{+3}(PO_4)_3$, the same activity is theoretically possible, since $Fe^{+2}$ is a stable and common oxidation state for Fe. This should allow two more lithium ions to be inserted. That is, $Li_{3+x}Fe_2(PO_4)_3$, x is about 2.

Various methods for fabricating electrochemical cells and for forming electrode components are described herein. The invention is not, however, limited by any particular fabrication method as the novelty lies in the unique positive electrode material itself and combination of positive and negative electrode materials. Accordingly, additional methods for preparing electrochemical cells and batteries may be selected and are described in the art, for example, in U.S. Pat. Nos. 5,435,054 (Tonder & Shackle); 5,300,373 (Shackle); 5,262,253 (Golovin); 4,668,595; and 4,830,939 (Lee & Shackle). Each of the above patents is incorporated herein by reference in its entirety.

In one embodiment, the present invention provides a method of preparing a compound of the nominal general formula $Li_3M'M''(PO_4)_3$. The method comprises providing a lithium-containing compound, one or more metal oxide compounds, and a phosphoric acid containing compound. Preferably, the lithium-containing compound is a lithium salt and the phosphoric acid compound is a phosphoric acid salt. The lithium compound, one or more metal oxide compounds, and phosphoric acid based compound are mixed together in a proportion which provides the stated nominal general formula. Such precursor compounds are intimately mixed and then reacted together where the reaction is initiated by heat and is preferably conducted in a nonoxidizing, reducing atmosphere, whereby the lithium, metal from a metal oxide, and phosphate combine to form the $Li_3M'M''(PO_4)_3$. Before reacting the compounds, the particles are intermingled to form an essentially homogeneous powder mixture of the precursors. Such intermingling is preferably conducted by forming a wet mixture using a volatile solvent and then the intermingled particles are pressed together in pellet form in grain-to-grain contact with one another. Although it is desired that the precursor compounds be present in a proportion which provides the stated general formula of the product, the lithium compound may be present in an excess amount on the order of 5 percent excess lithium compared to a stoichiometric mixture of the precursors. Although a number of lithium compounds are available as precursors, such as lithium acetate, lithium hydroxide, and lithium nitrate, lithium carbonate ($Li_2CO_3$) is preferred for the solid state reaction. The aforesaid precursor compounds are generally crystals, granules, and powders and are generally referred to as being in particle form. Although many types of phosphate salts are known, it is preferred to use ammonium phosphate ($(NH_4)_2HPO_4$). In the case where the compound of the formulation $Li_3M'M''(PO_4)_3$ is desired where M and M' are the same metal, a transition metal, such as vanadium, a suitable precursor is vanadium pentoxide ($V_2O_5$).

The starting materials are available from a number of sources. The following are typical. Vanadium pentoxide of the general formula $V_2O_5$ is obtainable from any number of suppliers including Kerr McGee, Johnson Matthey, or Alpha Products of Davers, Mass. It had a melting point of about 690° C., decomposed at 1750° C., a particle size of less than about 60 mesh (250 microns) and had a specific gravity of 3.357 grams per cc at 18° C. It was a yellow-red crystalline powder. Vanadium pentoxide has a CAS number of 1314-62-1. Alternatively, the vanadium pentoxide may be prepared from ammonium metavanadate ($NH_4VO_3$). The ammonium metavanadate is heated to a temperature of about 400° C. to about 450° C. to decompose it to vanadium pentoxide ($V_2O_5$). Processes for production of vanadium pentoxide are described in U,S. Pat. Nos. 3,728,442, 4,061,711 and 4,119,707, each of which is incorporated herein by reference in its entirety.

In another embodiment, for the formation of $Li_3M'M''(PO_4)_3$, where M' and M" are different from one another and are metals, preferably transition metals, one may select two different metal oxide powders, such as titanium oxide ($TiO_2$), vanadium oxide ($V_2O_5$), iron oxide (FeO, $Fe_2O_3$), chromium oxide ($CrO_2$, CrO, $Cr_2O_3$), manganese oxide ($MnO_2$, $Mn_3O_4$), and the like. In still another embodiment where the formulation $Li_3M'M''(PO_4)_3$ comprises two different metals, M' and M", one metal M' may be selected from non-transition metals and semi-metals. In another embodiment, non-transition metal has only one oxidation state and is nonoxidizable from its oxidation state in the final compound $Li_3M'M''(PO_4)_3$. In this case, M' may be selected from metals, such as aluminum and magnesium, calcium, potassium, and other Groups I and II metals, alkali Group I, and semi-metals. Semi-metals are located in the Periodic Table on the right hand side and roughly separate the nonmetals from metals, as is well known in the art. In this case, M" is a metal having more than one oxidation state, and is oxidizable from its oxidation state in the end product, and M" is preferably a transition metal. Examples are $Li_3KCr(PO_4)_3$ and $Li_3KMo(PO_4)_3$, where the transition metal (Tm) is, respectively, chromium and molybdenum.

EXAMPLE I

A preferred procedure for forming the $Li_3M'M''(PO_4)_3$ compound active material will now be described. The method for making $Li_3M'M''(PO_4)_3$ will be illustrated by formation of $Li_3V_2(PO_4)_3$-$(Li_3M_2(PO_4)_3)$. The basic procedure comprised conducting a reaction between a lithium compound, preferably lithium carbonate ($Li_2CO_3$), a metal oxide, preferably vanadium pentoxide ($V_2O_5$), and a phosphoric acid derivative, preferably the phosphoric acid ammonium acid salt, ammonium phosphate, $NH_4H_2(PO_4)_3$ or $(NH_4)_2H(PO_4)_3$. Each of the precursor starting materials are available from a number of chemical outfits including Aldrich Chemical Company and Fluka. The $Li_3V_2(PO_4)_3$ was prepared with approximately a stoichiometric mixture of $Li_2CO_3$, $V_2O_5$, and $(NH_4)_2HPO_4$. However, a 5 percent excess of lithium (as lithium carbonate) was used to minimize any lithium loss as ($Li_2O$). The precursor materials were initially intimately mixed and ground for about 30 minutes in a methanol solution. The intimately mixed compounds were then dried and pressed into pellets. Reaction was conducted by heating in an oven at a preferred ramped heating rate of 1° C. per minute up to a temperature of about 725° C., and held at 725° C. for about 12 hours to decompose the carbonate. Then heating continued at the same ramp rate (1° C. per minute) up to a temperature of about 875° C. The mixture was held at this temperature for about 24 hours. The entire reaction was conducted in a reducing atmosphere under flowing pure hydrogen gas. The flow rate will depend upon the size of the oven and the quantity needed to maintain a reducing atmosphere. Based on the size of the oven used in this example a flow rate of 25 cubic centimeters per minute was used. The oven was permitted to cool down at the end of the 24 hour period, where cooling occurred at a rate of about 3° C. per minute. Then the entire procedure was repeated once again for a further 24 hours. The repeated steps were also conducted under reducing atmosphere. Although hydrogen gas was selected to provide the reducing atmosphere, other means for obtaining the reducing atmosphere may be used.

The general aspects of the above synthesis route are applicable to a variety of starting materials. For example, LiOH and $LiNO_3$ salts may replace $Li_2CO_3$ as the source of lithium. In this case, the temperature for the first step will vary due to the differing melting points, 450° C. for LiOH and 700° C. for $LiNO_3$. The vanadium oxide $V_2O_5(V^{+5})$, combined with the oxidizing power of the phosphate anion, is required to be offset by a strong reducing agent, for example, the hydrogen atmosphere. Alternatively, lower oxidation state vanadium complexes could be used, e.g., $V_2O_3$. This is a vanadium in the 3+ state. But because of the presence of $PO_4$, a certain degree of oxidation might occur. Therefore, a reducing agent is used. For example, a mixture of 90:10 of $Ar:H_2$ can be used. The same considerations apply to other lithium-metal- and phosphate-containing precursors. The relative oxidizing strength of the selected precursors, and the melting point of the salts will cause adjustment in the general procedure, such as, selection of the reducing agent, its reducing capability and flow rate, and the temperature of reaction.

Figure 6:
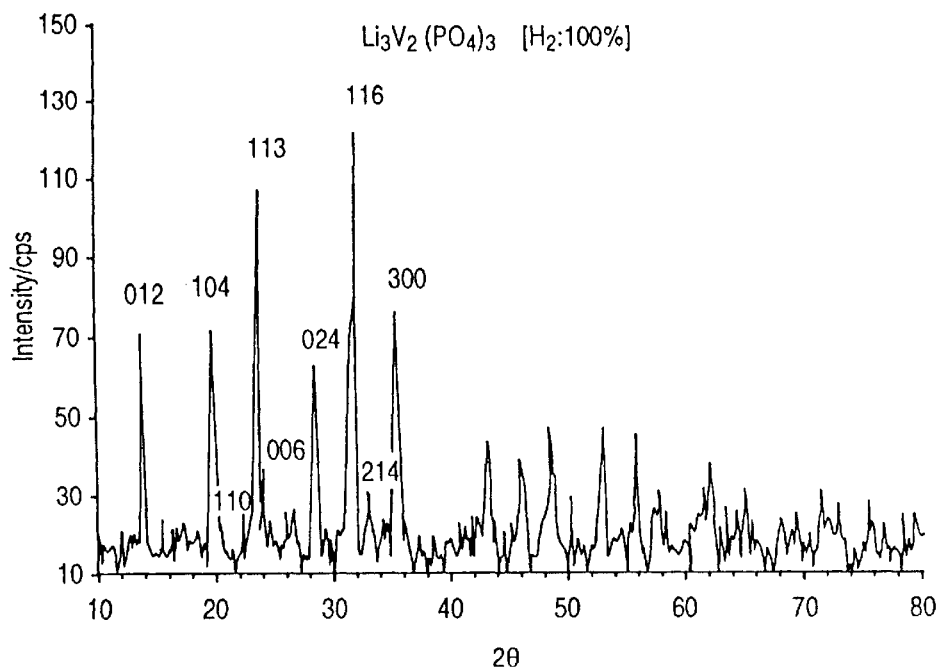
FIG. 6 shows the results of an x-ray diffraction analysis of the $Li_3V_2(PO_4)_3$ prepared according to the invention using CuKα radiation, λ=1.5418 Å.

The final product appeared lime-green in color, and its CuKa x-ray diffraction pattern contained all of the peaks expected for this material as shown in FIG. 6. The x-ray diffraction was conducted using CuKa radiation, $\lambda=1.5418$ Å. The pattern evident in FIG. 6 is consistent with a single oxide compound $Li_3V_2(PO_4)_3$. This is evidenced by the position of the peaks in terms of the scattering angle 2 $\Phi$ (theta), x axis. The x-ray pattern showed no peaks due to the presence of precursor oxides indicating that the solid state reaction is essentially entirely completed. Chemical analysis for lithium and vanadium by atomic absorption spectroscopy showed, on a percent by weight basis, 5.17 percent lithium and 26 percent vanadium. This is close to the expected result of 5.11 percent lithium and 25 percent vanadium.

The chemical analysis and x-ray pattern demonstrate that the product of the invention was indeed the nominal general formula $Li_3V_2(PO_4)_3$ corresponding to the more generic nominal general formula $Li_3M'M''(PO_4)_3$. The term "nominal general formula" refers to the fact that the relative proportion of atomic species may vary slightly on the order of 2 percent to 5 percent, or more typically, 1 percent to 3 percent.

EXAMPLE II

The $Li_3V_2(PO_4)_3$, prepared as described immediately above, was tested in an electrochemical cell. The positive electrode was prepared as described above under the section designated "Positive Electrode". The negative electrode was metallic lithium. The electrolyte was a 2:1 weight ratio mixture of ethylene carbonate and dimethyl carbonate within which was dissolved 1 molar $LiPF_6$. The cell was cycled between about 3.0 and about 4.3 volts with performance as shown in FIGS. 1, 2, 3, 4A, and 4B.

Figure 2:
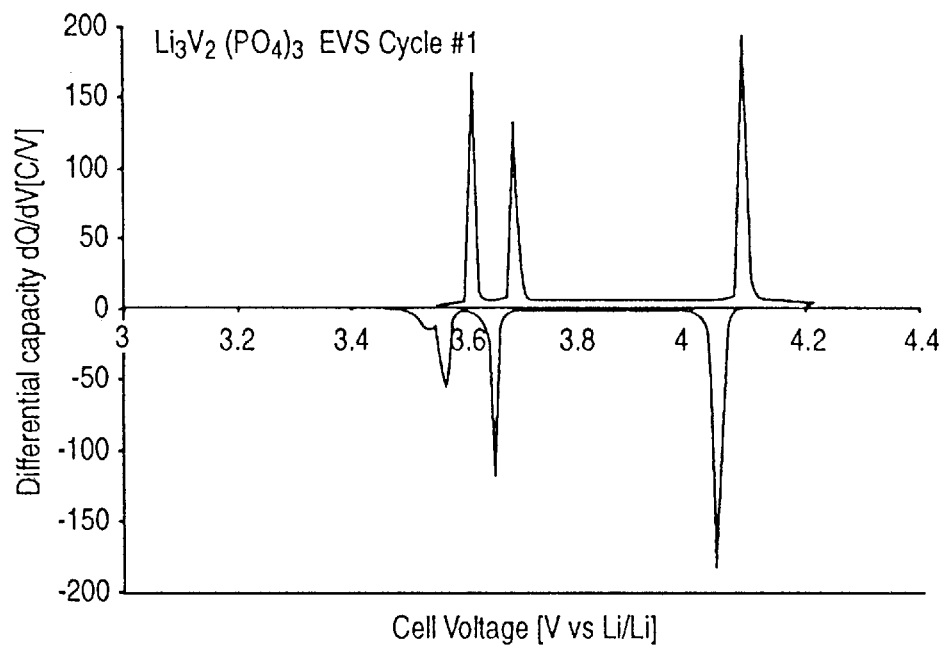
FIG. 2 is an EVS differential capacity plot for the cell as described in connection with FIG. 1.

FIG. 1 shows a voltage profile of the test cell, based on the $Li_3M'M''(PO_4)_3$ positive electrode active material of the invention, and using a lithium metal counter electrode as described in the examples. The data shown in FIG. 1 is based on the Electrochemical Voltage Spectroscopy (EVS) technique. Electrochemical and kinetic data were recorded using the Electrochemical Voltage Spectroscopy (EVS) technique. Such technique is known in the art as described by J. Barker in Synth, Met 28, D217 (1989); Synth. Met. 32, 43 (1989); J. Power Sources, 52, 185 (1994); and Electrochemica Acta, Vol. 40, No. 11, at 1603 (1995). FIG. 1 clearly shows and highlights the very high and unexpected degree of reversibility of the lithium ion reactions of the $Li_3M'M''(PO_4)_3$, specifically $Li_3V_2(PO_4)_3$, active material of the invention. The positive electrode contained about 16.8 milligrams of the $Li_3V_2(PO_4)_3$ active material. The total electrode weight including the binder and conductive carbon diluent was about 31.2 milligrams. The positive electrode showed a performance of about 136 milliamp hours per gram on the first discharge. In FIG. 1, the capacity in is essentially 136 milliamp hours per gram, and the capacity out is essentially 131 milliamp hours per gram, resulting in essentially no capacity change. FIG. 2 is an EVS differential capacity plot based on FIG. 1. As can be seen from FIG. 2, the relatively symmetrical nature of peaks indicates good electrical reversibility, there are small peak separations (charge/discharge), and good correspondence between peaks above and below the zero axis. There are essentially no peaks that can be related to irreversible reactions, since all peaks above the axis (cell charge) have corresponding peaks below the axis (cell discharge), and there is essentially no separation between the peaks above and below the axis.

Figure 3:
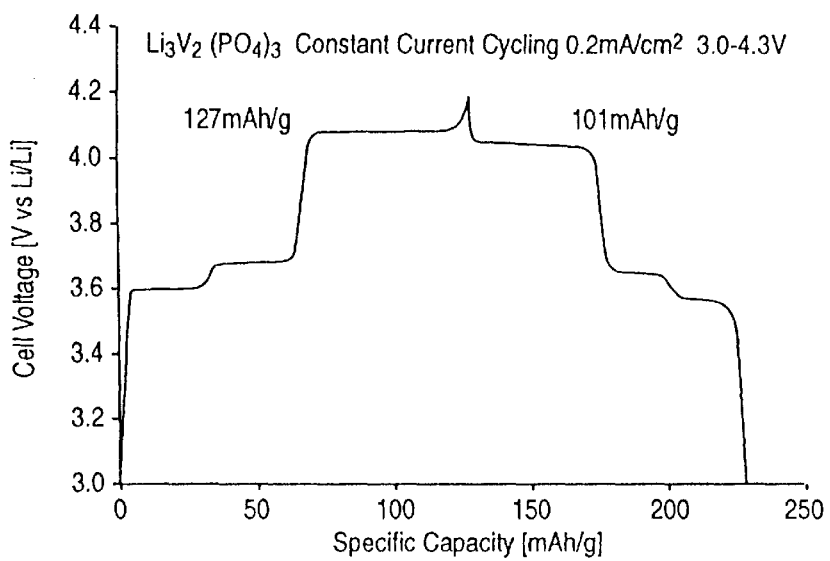
FIG. 3 is a voltage/capacity plot of $Li_3V_2(PO_4)_3$ cycled with a lithium metal anode using constant current cycling at±0.2 milliamps per square centimeter in a range of 3.0 to 4.3 volts.

FIG. 3 shows the results of the first constant current cycling at 0.20 milliamps per square centimeter between about 3.0 and 4.3 volts based upon about 16.8 milligrams of the $Li_3V_2(PO_4)_3$ active material in the cathode (positive electrode). In an as prepared, as assembled, initial condition, the positive electrode active material is $Li_3V_2(PO_4)_3$. The lithium is deintercalated from the $Li_3V_2(PO_4)_3$ during charging of the cell. When fully charged, about 2 units of lithium have been removed per formula unit of the original lithium-vanadium-phosphate. Consequently, the positive electrode active material corresponds to $Li_{3-x}V_2(PO_4)_3$ where x is greater than 0 and less than 3, and in the operation of this cell, x appears to be equal to about 2, when the cathode material is at 4.2 volts versus $Li/Li^+$. In this charged condition, the electrochemical potential versus lithium of the $Li_1V_2(PO_4)_3$ is about 4.2 volts. The deintercalation of 2 lithium from $Li_3V_2(PO_4)_3$ resulting in the $LiV_2(PO_4)_3$, represents approximately 127 milliamp hours per gram corresponding to about 2.2 milliamp hours based on 16.8 milligrams active material. Next, the cell is discharged whereupon a quantity of lithium is reintercalated into the $Li_1V_2(PO_4)_3$. The average voltage is approximately 3.8 volts versus $Li/Li^+$. The reintercalation corresponds to approximately 101 milliamp hours per gram proportional to the intercalation of about 1.54 atomic units of lithium. The bottom of the curve corresponds to approximately 3.0 volts.

Figure 4A:
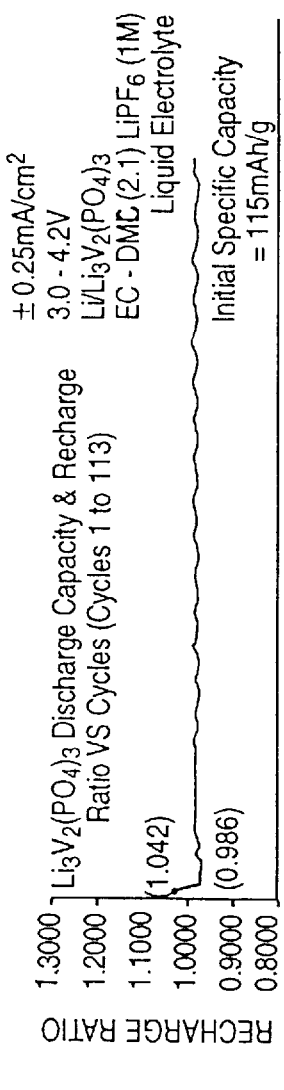
FIG. 4A shows the excellent rechargeability of the lithium-metal-phosphate/lithium metal cell.
Figure 4B:
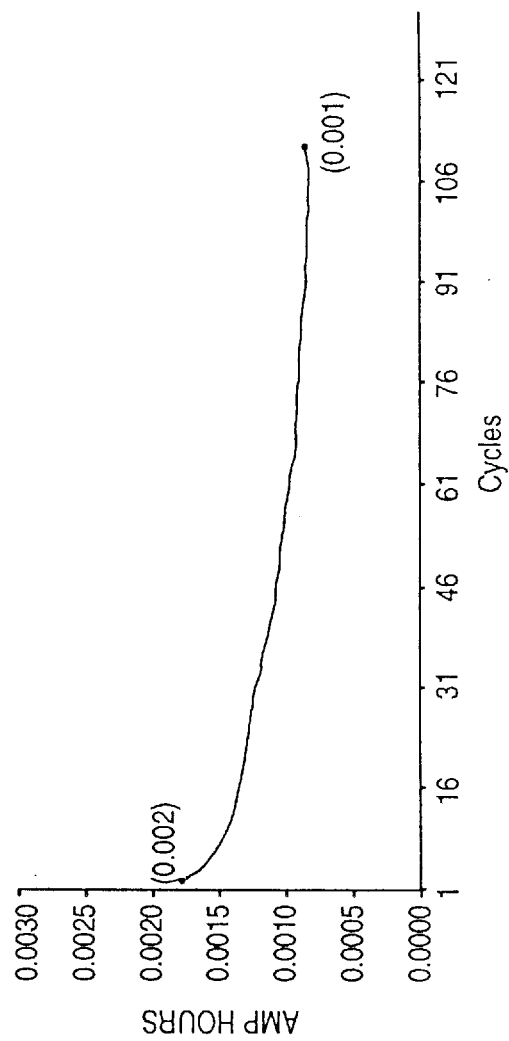
FIG. 4B shows the excellent cycling and capacity of the cell.

FIG. 4 presents data obtained by multiple constant current cycling at 0.25 milliamp hours per square centimeter of the $Li_3V_2(PO_4)_3$ versus lithium metal counter electrode between 3.0 and 4.2 volts using the electrolyte and with electrodes formed as described earlier and with an initial specific capacity of 115 milliamp hours per gram. FIG. 4 is a two part graph with FIG. 4A showing the excellent rechargeability of the $Li/Li_3V_2(PO_4)_3$ cell. FIG. 4B shows good cycling and capacity of the cell. The performance shown after 113 cycles is good and shows that electrode formulations of the type $Li_3M'M''(PO_4)_3$ are very desirable.

It should be noted that the formulations obtained by the method of the invention demonstrated capacity less than the achievable theoretical capacity. This is because the method of preparation and cell configurations have not yet been optimized for this remarkable material. Nevertheless, this material is highly desirable as an active material to replace the widely used $LiMn_2O_4$, $Li_1CoO_2$, and $LiNiO_2$, as can be seen by considering its theoretical capacity. The theoretical specific capacity for $Li_3V_2(PO_4)_3$ is about 190 milliamp hours per gram. This is based on extracting all 3 lithium from the original starting material. Actually, the theoretical capacity is closer to about 197 milliamp hours per gram corresponding to about 66 milliamp hours for each atomic unit of lithium extracted from the $Li_3V_2(PO_4)_3$ compound. Assuming that each such extracted unit of lithium corresponds to 66 milliamp hours, it can be seen that in FIG. 1 the charge extracted of 136 milliamp hours per gram corresponds to the extraction of slightly more than 2 units of lithium from the $Li_2V_2(PO_4)_3$. It should be noted that chemical deintercalation of potassium does not occur from potassium metal phosphates. Heretofore there has been no attempt to deintercalate lithium from a lithium-containing metal phosphate. Thus, the electrochemical reaction demonstrated by the present invention is remarkable as it has not heretofore been suggested. The product of the present invention may be compared to a Nasicon $(Na_3Zr_2PSi_2O_{12})$ framework which is a skeleton structure with an interconnected interstitial space. There are also the Langbeinite-type $(K_2Mg_2(SO_4)_3)$ structures which are true cage structures. Such structures do not permit mobility of mobile metal ions through the crystal. Some Nasicon-type structures possess ionic conductivity but have very poor electronic conductivity. Some Nasicon-type structures are usable as solid electrolytes, but are not usable as electrode materials. Such Nasicon structures do not have an oxidizable metal in their structure, therefore, an ion cannot be extracted. Thus, such structures and compounds are useless for ion battery, rocking chair battery, application. In contrast to the known art, the present invention provides a lithium-metal-phosphate compound having an oxidizable metal. Such metal is capable of more than one oxidation state. The metal is present in the lithium-metal-phosphate compound at less than its highest oxidation state. Therefore, the metal is oxidizable to provide capability to extract out one or more $Li^+$ ions. This is demonstrated by oxidation of V in $Li_3V_2(PO_4)_3$ from $V^{+3}V^{+3}$ to $V^{+4}V^{+5}$. It should be noted that based on formation of $LiVV(PO_4)_3$ and $LiVFe(PO_4)_3$, there are other combinations which may make possible extraction/insertion of Li in such lithium-phosphate compounds. The oxidation states for all such combinations are not verified, but are thought to be as per the examples. Note that the amount of $Li^+$ removed or added will determine the relative oxidation state of E' and E" or M' and M". Fe in $Li_3Fe_2(PO_4)_3$ from $Fe^{+3}Fe^{+3}$ to $Fe^{+4}Fe^{+5}$; Mn in $Li_3Mn_2(PO_4)_3$ from $Mn^{+3}Mn^{+3}$ to $Mn^{+4}Mn^{+4}$; and other $Li_3M_1M_2(PO_4)_3$ as per $Fe^{+2}Ti^{+3}$ to $Fe^{+3}Ti^{+4}$; $Co^{+2}Mn^{+2}$ to $Co^{+3}Mn^{+4}$; $Cu^{+2}Mn^{+2}$ to $Cu^{+3}Mn^{+4}$, and $Fe^{+3}V^{+3}$ to $Fe^{+4}V^{+5}$.

Lithium ion batteries made with this technology are made in the discharged state and need a conditioning charge (pre-charge) before use. In the initial condition (pre-charged state), anodes of lithium ion batteries are essentially free of lithium, and often free of ions thereof, as in the case of graphite. Therefore, such batteries are inherently more stable and relatively less reactive than batteries containing $LiMn_2O_4$ or lithium metal.

To achieve a useable potential difference, the (positive electrode) is electrochemically oxidized, while the anode (negative electrode) is reduced. Thus, during charging, a quantity (x) of lithium ions (Li$^+$) leave the positive electrode, Li$_{3-x}$M'$_y$M"$_{2-y}$(PO$_4$)$_3$, and the positive electrode is oxidized, increasing its potential; during charging, the Li ions are accepted at or intercalated into a negative electrode, preferably a carbon-based negative electrode, which is reduced. As a result, the negative electrode has a potential very close to the lithium metal potential, which is zero volts. A typical graphite electrode can intercalate up to about 1 atom of lithium per each of 6 carbons, that is, Li$_0$C$_6$ to Li$_1$C$_6$. During discharging, the reverse occurs, and a quantity of (x) of lithium (Li$^+$) ions leave the negative electrode, increasing its potential. During discharge, the lithium ions are accepted (intercalated) back into the positive electrode, which is reduced, and its potential is reduced. If the Li$_3$M'$_y$M"$_{2-y}$(PO$_4$)$_3$ compound were used as a negative electrode, during charge, Li ions would be transferred to the negative electrode, as Li$_{3+x}$M$_y$M$_{2-y}$(PO$_4$)$_3$ and the M', M", or both, would theoretically achieve a higher oxidation state. On discharge, the Li$^+$ions would be transferred back to the positive electrode.

While this invention has been described in terms of certain embodiments thereof, it is not intended that it be limited to the above description, but rather only to the extent set forth in the following claims.

The embodiments of the invention in which an exclusive property or privilege is claimed are defined in the following claims:

We claim:

1. A lithium ion battery comprising:
    a first electrode having an active material selected from the group consisting of Li$_{3-x}$V$_2$(PO$_4$)$_3$, with $0 \leq x \leq 3$, Li$_{3-x}$VTi(PO$_4$)$_3$ with $0 \leq x \leq 3$, Li$_{3-x}$FeV(Po$_4$)$_3$ with $0 \leq x \leq 3$, and mixtures thereof;
    a second electrode which is a counter-electrode to said first electrode; and
    an electrolyte between said electrodes.

2. A lithium ion battery comprising:
    a first electrode having an active material of the nominal general formula Li$_3$M'$_y$M"$_{2-y}$(PO$_4$)$_3$, $0 \leq y \leq 2$, where M' is V and M" is a transition metal selected from the group consisting of titanium (Ti), iron (Fe), vanadium (V), chromium (cr), manganese (Mn), cobalt (Co), molyldenum (Mo), nickel (Ni) and copper (Cu);
    a second electrode which is a counter-electrode to said first electrode; and
    an electrolyte between said electrodes.

3. A lithium ion battery comprising:
    a first electrode having an active material of the nominal general formula Li$_3$M'$_y$M"$_{2-y}$(PO$_4$)$_3$, $0 \leq y \leq 2$, where M' and M" are the same or different from one another and are each independently selected from the group consisting of vanadium (V), chromium (Cr), manganese (Mn), cobalt (Co), molybdenum (Mo), nickel (Ni) and copper (Cu);
    a second electrode which is a counter-electrode to said first electrode; and
    an electrolyte between said electrodes.

4. A lithium ion battery comprising:
    a first electrode having an active material of the nominal general formula Li$_3$M'$_y$M"$_{2-y}$(PO$_4$)$_3$, $0 \leq y \leq 2$, where M' is Fe and M" is different from Fe and selected from the group consisting of vanadium (V), chromium (Cr), manganese (Mn), cobalt (Co), molybdenum (Mo), nickel (Ni) and copper (Cu);
    a second electrode which is a counter-electrode to said first electrode; and
    an electrolyte between said electrodes.

5. A lithium ion battery comprising:
    a first electrode having an active material of the nominal general formula Li$_3$M'$_y$M"$_{2-y}$(PO$_4$)$_3$, $0 \leq y \leq 2$, where M' is Ti and M" is different from Ti and selected from the group consisting of vanadium (V), chromium (Cr), manganese (Mn), cobalt (Co), molybdenum (Mo), nickel (Ni) and copper (Cu);
    a second electrode which is a counter-electrode to said first electrode; and
    an electrolyte between said electrodes.

* * * * *